_United States Patent Office_ 3,230,069
Patented Jan. 18, 1966

3,230,069
METHOD OF INHIBITING PLANT GROWTH
William H. Preston, Jr., c/o Plant Introduction Station,
P.O. Box 88, Glenn Dale, Md.
No Drawing. Filed Aug. 27, 1958, Ser. No. 757,642
8 Claims. (Cl. 71—2.7)
(Granted under Title 35, U.S. Code (1952), sec. 266)

The invention described herein may be manufactured and used by or for the Government of the United States of America for governmental purposes without the payment to me of any royalty thereon.

This invention relates to a plant growth regulant. More particularly it relates to certain phosphonium compounds which inhibit the growth of plants such as grass, lilies, poinsettia, elm, buckwheat and the like.

The use of various chemical compositions as plant growth regulants is old and well known and it is also well known that these compositions have serious limitations and specificities. An example of such known regulants are the quaternary ammonium compounds which after extensive tests have proven to be either inactive or inefficient when applied to certain varieties of plants. In this connection, it is noteworthy that in a relatively recent Department of Agriculture test one of the most active compounds within this quaternary ammonium class, viz (4-hydroxy - 5 - isopropyl - 2 - methylphenyl) - trimethyl ammonium chloride, 1-piperidine-carboxylate, was found to be very active on only seven out of forty-three plants while twenty-one showed no response whatsoever. The pattern of this response is not particularly unusual. It is rather obvious therefore that a single composition will not be responsive over a wide variey of plant species, necessitating mixtures of various active ingredients for general application. Clearly, this is inefficient and uneconomical. Furthermore, there are plants that are relatively non-responsive to any known growth regulant.

Moreover, it has long been desirable to use various species of lilies for florist sales and exhibition; however, only a few such species are satisfactory since the majority of the lily plants often have stems that are too long or too fragile for convenient handling. Shipment and handling of such plants would usually cause the stems to be broken. Thus, many of the various varieties of lilies never have been used as pot plants. Heretofore, no plant growth regulant was known to exist that will satisfactorily reduce stem growth without damage to either the flower or the leaves.

In the cotton growing industry, the harvesting machines are designed to pick cotton from plants up to 5 feet high but in many instances the plants grow to abnormal heights of 6 to 8 feet making the existing harvesting machines inadequate. No adequate method of height reduction has been heretofore used successfully.

Vine crops such as cucumber, watermelon, grape, etc. extend many feet in area much of which is wasted by long stem growth. It is obivous that if the stem growth were dwarfed and the productive yield per plant maintained that more plants per acre are possible with a resulting greater yield per acre. Also the staking of the vines in most cases would be reduced or eliminated with a consequential reduction in cost.

Further, there are other plant varieties upon which known plant growth regulants have shown little or no response among which may be mentioned: poinsettias, buckwheat, balsam, peanut, mung bean, elm and grasses. This listing is by no means complete but only indicates the complete lack of efficient growth regulants for many common varieties of plants.

With these problems in mind and to fill the long felt need in the art, it has been discovered that phosphonium compounds in general and certain compounds in particular exhibit unexpected dwarfing characteristics upon a wider variety of plants than heretofore existed with other known regulants. Furthermore, the phosphonium compounds have been found to leave the flowers and fruit without deleterious effects while imparting a darker green color to the leaves. The latter effect is significant in the flower industry.

The compounds of this invention have the following general formula:

wherein $R_0$, $R_1$ and $R_2$ are aliphatic groups; $R_3$ is selected from the group consisting of an aliphatic group and an aromatic group, and X is selected from the group consisting of a substituted or unsubstituted benzene-sulfonate and a halide. The terms aliphatic and aromatic when used hereinafter in either the specification or the claims is to include substituted and unsubstituted compounds.

The compounds in most instances may be prepared by standard methods well known in the art, for example, by the addition of halogenated hydrocarbon to phosphine as described in Ann. der Chemie 207 page 193; 229 pages 309, 318. Hydrohalid acid salts of the quaternary phosphonium bases are thus obtained such as the phosphonium chloride. Such compounds have been known for many years and their preparation is a simple matter to a skilled chemist.

Benzyldimethyl - 3,5,5 - trimethylhexylphosphonium benzenesulfonate is a compound within this invention and is prepared according to the following equations:

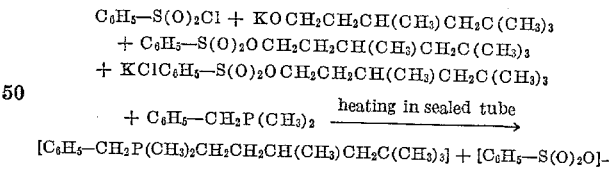

A simpler synthesis of a related compound, benzyldimethyl - 3,5,5 - trimethylhexylphosphonium bromide, with less complication, would be:

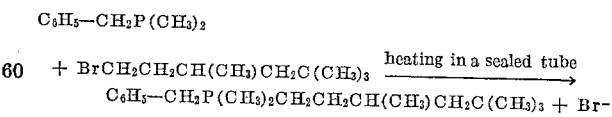

Conversion to the chloride is by standard methods.
Another compound within this invention is (2-methyl-4- hydroxy-5-isopropylbenzyl) trimethylphosphonium chloride, 1-piperidinecarboxylate and is prepared as follows:

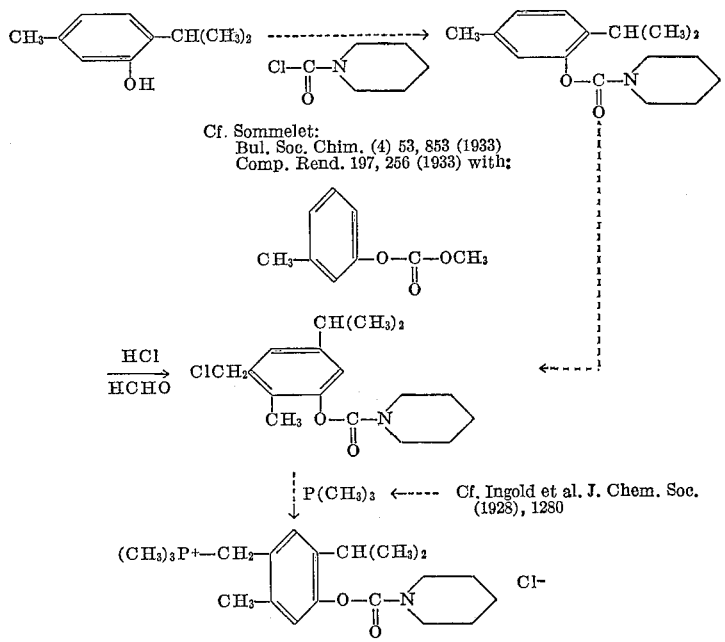

EXAMPLE I 2,4-dichlorobenzyltributylphosphonium chloride was applied to Black Valentine bean plant stems and to soybean plant stems as a paste made up of 1% of the compound and a 4:1 ratio of lanolin and Tween 20. The subsequent growth of each of these treated plants was darker green and much shorter than that of control plants while the bean yield maintained the same quantity and quality.

EXAMPLE II

A 1% and a 2% aqueous solution of 2,4-dichlorobenzyltributylphosphonium chloride with a slight trace of Tween 20 were sprayed on young elm and hibiscus trees. The results showed that the chemical induced shorter internodes and darker green leaves to develop.

EXAMPLE III

The same sprays as in Example II when used on philodendron caused shorter internodes to develop for the next eleven months.

EXAMPLE IV

The same paste as in Example I when applied to plant stems caused marked reduction in heights of mung bean, snap bean, soybean, scarlet runner bean, sweetpea, peanut, sunflower, balsam (Impatiens), and morning glory. Noticeably darker green foliage developed on the bean crops, sweetpea, and peanut. The yield of beans and peanuts were identical with controls.

EXAMPLE V

The compound of Example I when mixed in the soil at the rate of 35 pounds per acre caused marked dwarfing of poinsettias.

EXAMPLE VI

The compound of Example V when mixed with the soil at rates of 17.5 and 35 pounds per acre caused lily plants to develop shorter internodes and darker green leaves.

EXAMPLE VII

Annular rye grass sown in soil was treated with $S_1$, 35 pounds per acre and $S_2$, 17.5 pounds per acre of 2,4-dichlorobenzyltributylphosphonium chloride. $S_1$ treated stems averaged 3.5 in. and $S_2$ treated stems averaged 15 in. compared to the controls which averaged 21.0 in two months after sowing.

EXAMPLE VIII

Dodecyltrimethylphosphonium chloride was substituted for the compound in Example I and applied in the same manner to Black Valentine bean with substantially the same result.

EXAMPLE IX

Soybean plants were substituted for the Black Valentine bean plants of Example VIII with substantially the same result.

EXAMPLE X

Tetraethylphosphonium chloride was substituted in Example I with the same result. This compound was also applied to soybean which subsequently developed dwarf growth without change in quantity or quality of yield.

EXAMPLE XI

Phenyltrimethylphosphonium chloride was applied to Black Valentine bean according to Example I with identical results. The application of this compound to soybean produced similar results.

EXAMPLE XII

1% benzyldimethyl - 3,5,5-trimethylhexylphosphonium benzene sulfonate when applied to both soybean and Black Valentine bean showed the same growth inhibition on both test plants. The beans showed no deleterious effects and no reduction in quantity occurred.

EXAMPLE XIII

1% 6-hydroxythymyltrimethylphosphonium chloride, 1-piperidinecarboxylate was also applied to Black Valentine bean and soybean plants according to the method of Example I with similar results.

EXAMPLE XIV 2,4-dichlorobenzyltrimethylphosphonium chloride was applied to Black Valentine bean and soybean plants as per Example I and produced similar results.

EXAMPLE XV

1% aqueous solution of (5-hydroxycarvacryl)trimethylphosphonium chloride, dimethylcarbamate was applied to young cotton plants as a spray. At maturity treated plants averaged 3.4 feet in height while controls were 6.7 feet. The cotton obtained was not affected in either quantity or quality.

EXAMPLE XVI

1% aqueous solution of 2,4-dichlorobenzyltributylphosphonium chloride was applied to cotton plants as in Example XV with substantially identical results.

EXAMPLE XVII 35 lbs./acre of 2,4-dichlorobenzyltributylphosphonium chloride was applied to the soil before the planting of young cucumber plants. At harvesting the same number of cucumbers were present on both the treated and control plants and they were of equal quality and size but the area covered by the treated plants was from 50 to 75% reduced.

EXAMPLE XVIII 35 lbs./acre of (5-tert-butyl-4-hydroxy-o-tolyl)trimethylphosphonium chloride, 1-piperidinecarboxylate was applied to the soil as per Example XVII with identical results.

These examples are only a partial listing of the possible examples such as those listed hereinafter as constituting part of Table A, all tests being conducted according to the manner set forth in Example I.

Each of the compounds set forth in the examples had either a chloride or a sulfonate attached to the phosphorous atom; however, the other halides were tested but found to be slightly less active in this order, bromide, iodide, fluoride. It should be noted, however, that a fluorine substitution on the aromatic ring in general produces the greatest activity.

The manner of application of the compound to the plants is significant only in so far as soil treatment prior to planting will control the growth of the plants for a longer time without reapplication while spraying of the beans is the least effective and generally requires application to the plants two or three times a growing season to exhibit the same response as it would by soil treatment. Applying a paste to the stems is slightly less effective than its use in the soil but often more effective than a spray. Other methods of application were used and found effective such as the coating (by immersion) of Vermiculite (expanded mica), sand or other similar carrier with the dwarfing chemical and applying to the surface of the soil where rainfall or artificial irrigation will subsequently impregnate the chemical in the soil. Further the inclusion of the phosphonium compounds with the usual fertilizer has proven to be very useful.

The following tables show the effectiveness of the compounds as applied to various plants. Among the compounds tested which provided a basis for Tables A and B are:

dodecyltrimethylphosphonium chloride;
tetraethylphosphonium chloride;
phenyltrimethylphosphonium chloride;
benzyldimethyl-3,5,5-trimethylhexylphosphoninum benzene sulfonate;
6-hydroxythymyltrimethylphosphonium chloride, 1-piperidinecarboxylate;
2,4-dichlorobenzyltrimethylphosphonium chloride;
2,4-dichlorobenzyltributylphosphonium chloride;
(4-hydroxy-5-isopropyl-2-methylphenyl)-trimethylphosphonium chloride, 1-piperidinecarboxylate;
dodecyltrimethylphosphoniumbenzenesulfonate;
benzyldodecyldimethylphosphoniumbenzenesulfonate;
(3-cyclohexyl-2-hydroxybenzyl)-trimethylphosphonium chloride, dimethylcarbamate;
9-fluorenyltrimethylphosphonium chloride;
9-fluorenyltrimethylphosphonium bromide;
2-hydroxy-5-(phenylthio)benzyltrimethylphosphonium chloride, dimethylcarbamate;
benzyl(2,2-dimethyl-5-oxo-3-undecenyl)-dimethylphosphonium chloride;
benzyldodecyldimethylphosphonium chloride;
(5-tert-butyl-4-hydroxy-o-tolyl)trimethylphosphonium chloride, 1-piperidinecarboxylate;
(carboxymethyl)-dimethyl-{2-[2-(x-1,1,3,3-tetramethylbutylphenoxy)ethoxy]ethyl}-phosphonium chloride, ethylester;
(2,4-dichlorobenzyl)diethyl(2-hydroxyethyl)-phosphonium chloride;
(2,4-dichlorobenzyl)dodecyldimethylphosphonium chloride;
(2,4-dichlorobenzyl)hexadecyldimethylphosphonium chloride;
(2,4-dichlorobenzyl)triethylphosphonium chloride;
didodecyldimethylphosphonium chloride;
dimethylditetradecylphosphonium chloride;
dimethyloctylpiperonylphosphonium chloride;
dodecyltrimethylphosphonium chloride;
dodecyltrimethylphosphonium chloride;
trimethyltetradecylphosphonium chloride;
hexadecyltrimethylphosphonium chloride;
trimethyl-x-octadecenylphosphonium chloride;
hexyldimethyl-(p-nitrobenzyl)phosphonium chloride;
hexyldimethylpiperonylphosphonium chloride;
(2-methoxy-4,6-dimethyl-m-phenylenedimethylene)bis-[benzyldimethyl]phosphonium chloride;
trimethyl-x,x-octadecadienylphosphonium chloride;
trimethyl-x-octadecenylphosphonium chloride;
dodecyltrimethylphosphonium p-chlorobenzenesulfonate;
dodecyltrimethylphosphonium p-fluorobenzenesulfonate;
(5-tert-butyl-4-hydroxy-o-tolyl)trimethylphosphonium iodide, 1-piperidinecarboxylate;
[2-(5-cyclohexyl-2H-tetrazol-2-yl)ethyl]trimethylphosphonium iodide;
(2,4-dichlorobenzyl)triethylphosphonium iodide;
(5-hydroxycarvacryl)trimethylphosphonium iodide, (2-chloroethyl)-ethylcarbamate and the diethyl and dimethyl carbamates;
(6-hydroxythymyl)-trimethylphosphonium iodide, 4-morpholinecarboxylate;
(3,4-dichlorobenzyl)-dimethyloctylphosphonium iodide;
dodecyltrimethylphosphonium p-(1-methylbutyl)benzenesulfonate;
dodecyltrimethylphosphonium m-nitrobenzenesulfonate:
dodecyltrimethylphosphonium p-toluene-sulfonate;
(6-hydroxythymyl)trimethylphosphonium chloride, 4-morpholinecarboxylate;
phenyltrimethylphosphonium chloride, 1-piperidinecarboxylate;
2-chloro-4-fluorobenzyltributylphosphonium chloride;
2,4,5-trichlorobenzyltributylphosphonium chloride;
3,5-dichloro-2-pyridinyltrimethylphosphonium chloride and [2-(3,4-dichlorothiophene)methyl]trimethylphosphonium chloride.

The above grouping is only a partial listing and is not to be construed as limiting the scope of the invention but rather is set forth to indicate the broad scope of the invention.

Table A

Responses of 14 plants to treatments with the above 53 growth regulating related phosphonium compounds.

|  | A | B | C | D | E | F | G | H |
|---|---|---|---|---|---|---|---|---|
| Cucumber | 50.7 | X |  | X | X |  |  | X |
| Soybean | 31.1 |  |  |  | 2.2 |  |  | X |
| Morning Glory | 14.3 |  |  | X | X |  |  |  |
| Mung Bean | 80.4 |  | X |  | 7.6 |  |  | X |
| Bean | 76.9 |  | X | X | 3.4 |  |  | X |
| Privet |  | X |  |  |  |  |  |  |
| Elm |  | X |  | X |  |  |  |  |
| Sweetpea | X | X | X | X |  |  |  | X |
| Poinsettia |  | X | X |  |  |  |  | X |
| Lily |  |  | X |  |  |  |  |  |
| Philodendron |  |  |  | X |  |  |  |  |
| Scarlet Runner Bean | X |  |  |  |  | 20.6 | X | X |
| Peanut |  |  |  |  |  |  |  | X |
| Annual Rye Grass |  | X | X | X | X |  |  |  |

A—shorter petioles (Average percent).
B—smaller leaves.
C—shorter length of flower stalks.
D—retarded development.
E—delayed flowering (Average days).
F—hastened flowering (Average days).
G—induced flowering.
H—Darker green leaves.
X—Response by every compound of class tested.

The following plants treated with 2-4-dichlorobenzyl tributylphosphonium chloride developed shorter internodes than did controls:

5. Method according to claim 1, wherein said compound is dimethylditetradecylphosphonium chloride.

*Table B*

| Plants | Part of stem measured | Stage of development | (Length (in cm.) (average)) | | Percent Inhibition of elongation (average) |
|---|---|---|---|---|---|
| | | | Untreated | Treated | |
| Soybean | 1st 3 internodes above tr. area | When fully elongated | 7.72 | 4.54 | 41.2 |
| Buckwheat | Base of 1st internode to tip of first true leaf. | 13 days after treatment | 6.6 | 1.9 | 71.2 |
| Balsam | Total ht. minus ht. at treatment | At maturity (seed prod.) | 12.6 | 9.2 | 28.1 |
| Peanut | Height above treated area | 14 days after treatment | 5.98 | 2.16 | 63.9 |
| Marigold | ----do---- | At maturity (seed prod.) | 5.7 | 4.3 | 24.6 |
| Bean | 1st 3 internodes above tr. area | When fully elongated | 15.72 | 3.32 | 78.9 |
| Mung Bean | ----do---- | ----do---- | 9.22 | 2.66 | 69.1 |
| Cotton | 1st 2 internodes above tr. area | ----do---- | 2.51 | 1.26 | 49.8 |
| Sweetpea | Height above treated area | 39 days after treatment | 49.8 | 11.4 | 77.1 |
| Sunflower | ----do---- | 13 days after treatment | 33.6 | 18.9 | 71.5 |
| Scarlet runner bean | ----do---- | 65 days after treatment | 149.4 | 20.8 | 86.2 |
| Lily | Total height of plant | 95 days after treatment | 46.6 | 33.8 | 27.5 |
| Poinsettia | Growth since planting | At maturity (flowering) | 22.6 | 9.7 | 57.1 |
| Elm | Growth since treatment | 15 days after treatment | 35.5 | 9.0 | 74.6 |
| Philodendron | ----do---- | 11 mo. after treatment | 193.6 | 92.0 | 52.5 |
| Morning Glory | 1st 5 internodes above treatment | When fully elongated | 26.8 | 10.8 | 59.7 |
| Cucumber | Height above treated area | 22 days after treatment | 15.0 | 5.3 | 64.7 |

These tables clearly indicate the range of the effectiveness of the instant compounds as well as the quality of the physiological effects to an extent beyond that heretofore known in the art.

No known compound is believed to have as wide a range and as great effectiveness as do the phosphonium compounds within the general formula set forth.

Variations in the lengths of the chains of the aliphatic groups as well as various substitutions such as the halides onto either the alkyl or aromatic groups have been tested and the results prove that such compounds within the general formula are effective as plant growth-controlling materials.

From the foregoing detailed description it will be evident that there are a number of changes adaptations and modifications of the present invention that come within the province of those skilled in the art; however, it is intended that all such variations in structure, modes of usage and materials be considered to be within the scope of this invention as limited solely by the appended claims.

I claim:

1. Method of dwarfing a plant, which comprises applying thereto a dwarfing amount of a compound of the formula

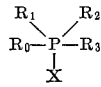

wherein $R_0$, $R_1$, $R_2$ and $R_3$ are alkyl having 1 to 16 carbon atoms, and wherein X is a halogen.

2. Method according to claim 1, wherein X is chlorine.

3. Method of dwarfing a plant which comprises applying thereto a dwarfing amount of tetraethylphosphonium chloride.

4. Method according to claim 1, wherein said compound is selected from a member of the group consisting of dodecyltrimethylphosphonium chloride and didodecyldimethylphosphonium chloride.

6. Method according to claim 1, wherein said compound is trimethyltetradecylphosphonium chloride.

7. Method according to claim 1, wherein said compound is hexadecyltrimethylphosphonium chloride.

8. Method of inhibiting the growth of a plant, which comprises applying thereto a growth-inhibiting amount of a compound of the formula

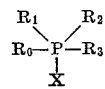

wherein $R_0$, $R_1$, $R_2$ and $R_3$ are alkyl having 1 to 16 carbon atoms, and wherein X is a halogen.

References Cited by the Examiner

UNITED STATES PATENTS

| | | | |
|---|---|---|---|
| 2,032,097 | 2/1936 | Piggott et al. | 260—606.5 X |
| 2,271,622 | 2/1942 | Carroll et al. | 260—606.5 |
| 2,360,623 | 10/1944 | Rosen | 260—606.5 |
| 2,514,131 | 7/1950 | Kaszuba | 106—176 X |
| 2,703,814 | 3/1955 | Dye | 260—551 |
| 2,785,967 | 3/1957 | Dye | 71—2.3 |
| 2,854,791 | 10/1958 | Antognini | 71—1 X |
| 2,855,285 | 10/1958 | Antognini | 71—1 |

OTHER REFERENCES

Chem. Soc. Jour. (London), 1933, pp. 989–991 (Fenton et al.).

"Plant Regulators," p. 38, Chemical Biological Coordination Center Data Series, No. 2, June 1955.

LEWIS, GOTTS, *Primary Examiner.*

L. D. ROSDOL, M. A. BRINDISI, IRVING MARCUS,
*Examiners.*

L. A. SEBASTIAN, E. J. MEROS, JAMES O. THOMAS,
*Assistant Examiners.*